US009122858B2

(12) United States Patent
Dittrich et al.

(10) Patent No.: US 9,122,858 B2
(45) Date of Patent: Sep. 1, 2015

(54) ACCESSING MULTIPLE CLIENT DOMAINS USING A SINGLE APPLICATION

(75) Inventors: Andrew Dittrich, Kansas City, MO (US); Steve Harlow, Lee's Summit, MO (US); Kris Kline, Overland Park, KS (US); Jerehmiah Jessee-Lantz, Belton, MO (US); Christopher Cline, Smithville, MO (US); Brad Jennings, Kansas City, MO (US); William Mark Kinsella, Kansas City, MO (US)

(73) Assignee: CERNER INNOVATION, INC., Kansas City, KS (US)

( * ) Notice: Subject to any disclaimer, the term of this patent is extended or adjusted under 35 U.S.C. 154(b) by 377 days.

(21) Appl. No.: 13/292,695

(22) Filed: Nov. 9, 2011

(65) Prior Publication Data

US 2013/0117816 A1    May 9, 2013

(51) Int. Cl.
| | | |
|---|---|---|
| *G06F 17/30* | (2006.01) | |
| *G06F 21/33* | (2013.01) | |
| *G06F 21/41* | (2013.01) | |
| *H04L 29/06* | (2006.01) | |
| *H04W 12/06* | (2009.01) | |

(52) U.S. Cl.
CPC ............... *G06F 21/335* (2013.01); *G06F 21/41* (2013.01); *H04L 63/0807* (2013.01); *H04W 12/06* (2013.01)

(58) Field of Classification Search
CPC ..................... H04L 63/0815; H04L 29/12066; H04L 61/1511; H04L 67/14; H04L 67/18; H04L 67/24; H04L 67/28; G06F 17/3089; G06F 17/2235; G06F 17/30867; G06F 3/01; G06F 21/562

See application file for complete search history.

(56) References Cited

U.S. PATENT DOCUMENTS

| | | | |
|---|---|---|---|
| 2009/0037997 A1* | 2/2009 | Agbabian et al. | 726/10 |
| 2009/0109854 A1* | 4/2009 | Rajpathak | 370/238 |
| 2009/0228966 A1* | 9/2009 | Parfene et al. | 726/7 |
| 2009/0238364 A1* | 9/2009 | Furukawa et al. | 380/243 |
| 2010/0153862 A1* | 6/2010 | Schreiber | 715/760 |
| 2011/0265172 A1* | 10/2011 | Sharma et al. | 726/8 |
| 2013/0096649 A1* | 4/2013 | Martin et al. | 607/60 |

* cited by examiner

*Primary Examiner* — Nirav B Patel
*Assistant Examiner* — Mohammed Waliullah
(74) *Attorney, Agent, or Firm* — Shook, Hardy & Bacon L.L.P.

(57) ABSTRACT

Methods, computer systems, and computer-readable storage media for using a single application on a mobile device to access a plurality of client domain sites are provided. The single application on the mobile device receives from a user of the mobile device a set of authorization credentials. Based on the set of authorization credentials, the single application receives a first client domain uniform resource locator from a third-party directory service. The first client domain uniform resource locator is used to access a client gateway service; the client gateway service provides a secure access point to a number of different service solutions hosted by a client. Upon the user inputting a set of authentication credentials, the user is able to access information from one or more of the different service solutions.

13 Claims, 8 Drawing Sheets

ACCESSING MULTIPLE CLIENT DOMAINS USING A SINGLE APPLICATION

BACKGROUND

Traditionally, a user attempting to utilize a third-party directory to access a client's private Web site has been presented with a listing of all clients within the third-party directory. Upon presentation of the list of clients, the user selects the desired client and is directed to the client's private Web site. However, this arrangement contributes to the needless exposure of private client lists to users who may have no relationship with the clients which, in turn, can raise concerns for these clients.

Alternatively, instead of using a third-party directory to access private client Web sites, a user has had to download multiple applications in order to access information from the different client sites. Each application corresponds to a different client site and enables the user to access only that client site. When the user wishes to access a different client site, the user is required to switch to a different application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

In brief and at a high level, this disclosure describes, among other things, an application on a mobile device that provides secure access to a number of different client Web sites; the client Web sites can be private or public. More specifically, the first time a user of the mobile device logs in to the application with a set of authorization credentials, a third-party directory service determines a client domain site associated with the set of authorization credentials. The client domain site is bookmarked on the mobile device. Upon user selection of the bookmark, the user is directed to the client domain site. After inputting a set of authentication credentials, the user can access the different service solutions associated with the client domain site. The process described above can be subsequently used to access different client domain sites—all using the same application residing on the mobile device.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to methods, computer systems, and computer-readable storage media for use in enabling a user to securely access multiple private client Web sites using a single application on a mobile device. In one aspect, the first time a user accesses the application with a set of authorization credentials, a third-party directory service is utilized to determine a client domain uniform resource locator (URL) associated with the set of authorization credentials. The client domain URL is stored in association with the mobile device as a bookmark. Subsequently, and upon user selection of the bookmark, the user can directly navigate to the client site using the client domain URL. Once at the client site, the user can utilize the various services associated with the client site. The application on the mobile device can also be used to determine additional private client domain sites and direct the user to those sites.

In another aspect of the invention, a third-party directory service provides secure access to a number of different private client domain sites. The third-party directory service receives a set of authorization credentials from an application residing on a mobile device. The third-party directory service accesses a third-party directory data store. The third-party directory data store comprises a plurality of private client domain URLs stored in association with a plurality of sets of authorization credentials. Using the third-party directory data store, the third-party directory service determines a first private client domain URL associated with the set of authorization credentials and communicates the first private client domain URL to the application on the mobile device. The third-party directory service can receive any number of sets of authorization credentials corresponding to different private client domain sites from the application on the mobile device.

Figure 1:
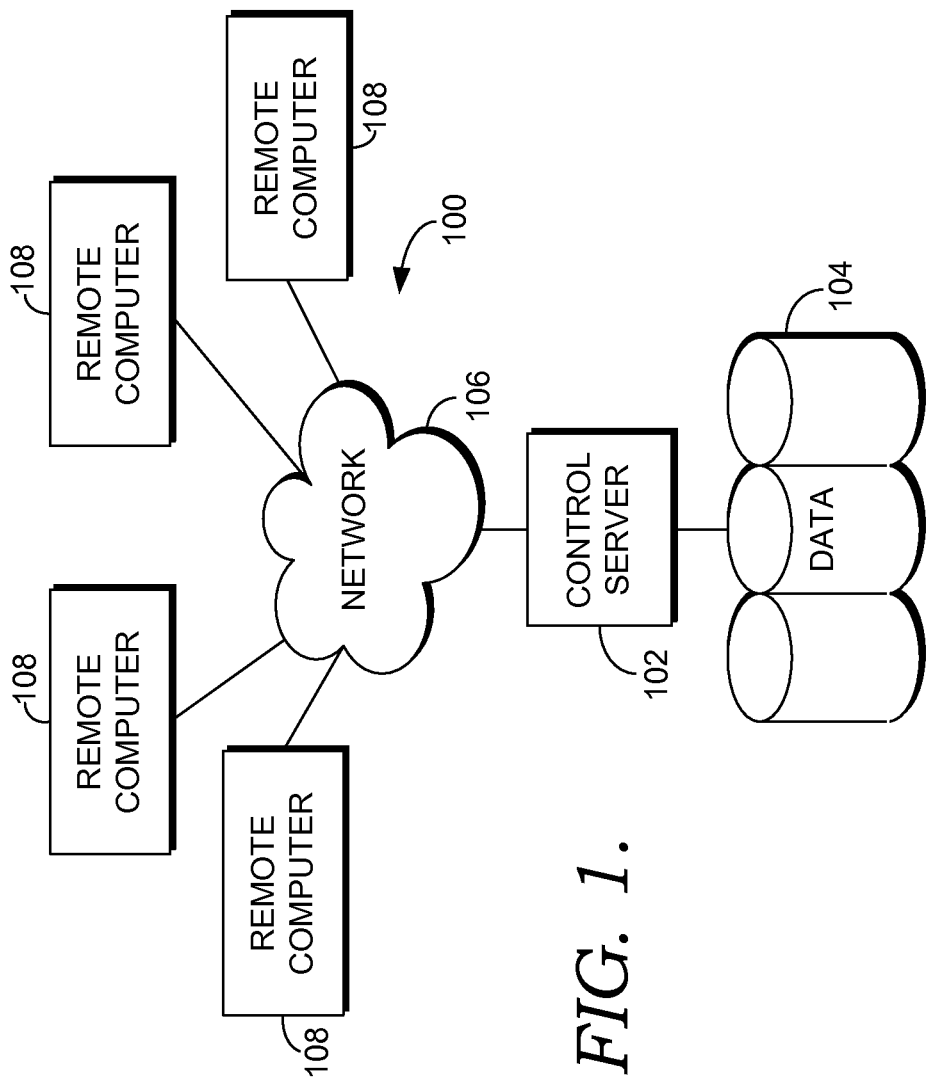
FIG. 1 is a block diagram of an exemplary computing environment suitable to implement embodiments of the present invention.

Having briefly described embodiments of the present invention, an exemplary computing environment suitable for use in implementing embodiments of the present invention is described below. FIG. 1 is an exemplary computing environment (e.g., medical-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein.

The present invention might be operational with numerous other purpose computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and clinicians' offices. Clinicians may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
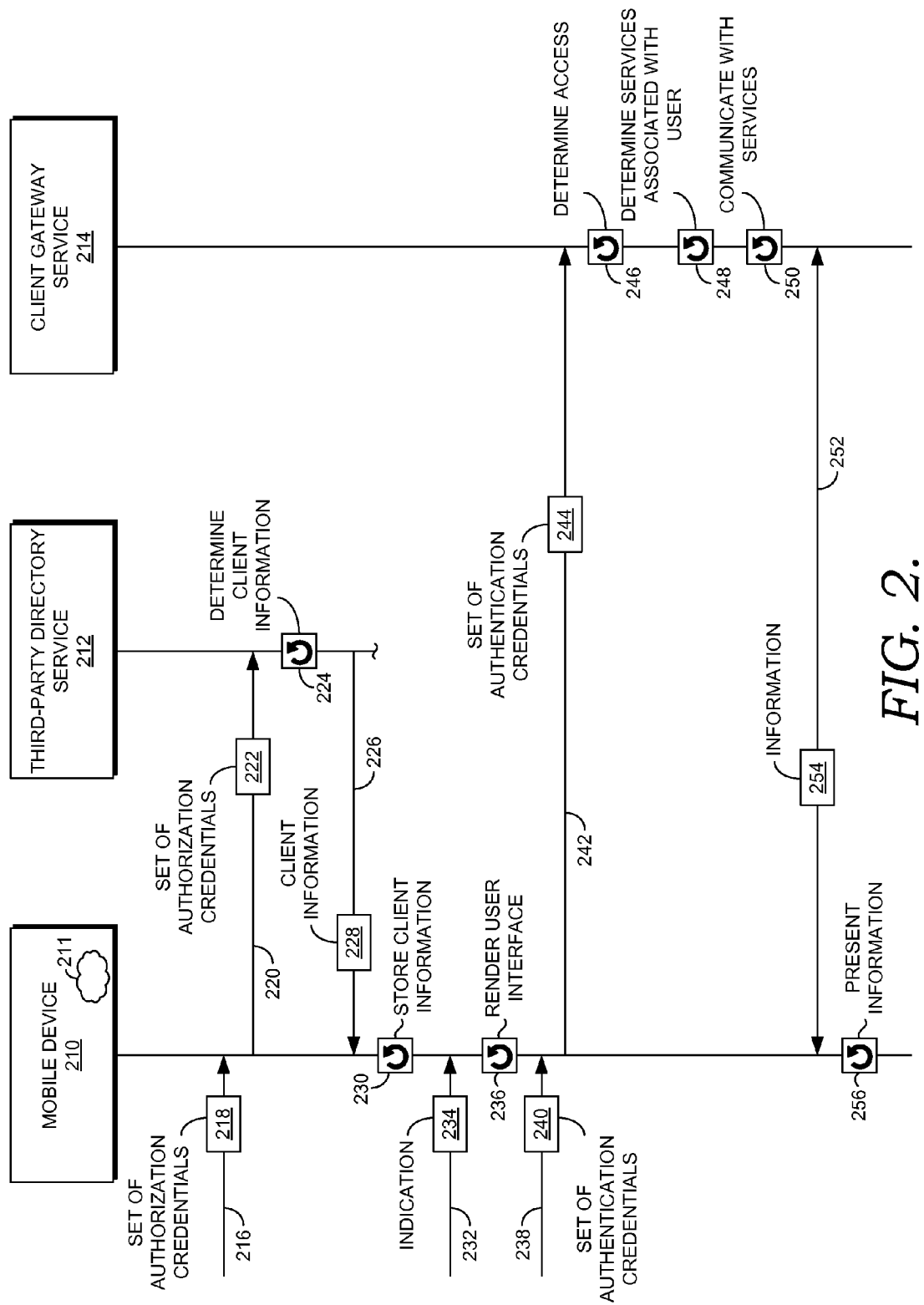
FIG. 2 depicts an illustrative process-flow diagram that depicts a method of providing secure access to a plurality of client domain sites according to an embodiment of the present invention.

Turning now to FIG. 2, a process-flow diagram, referenced generally by the numeral 200, is depicted illustrating a method of providing secure access to a plurality of client domain sites using a single application on a mobile device. FIG. 2 includes a mobile device 210, a third-party directory service 212, and a client gateway service 214.

The mobile device 210 may be any type of wireless-telecommunications device. Such devices may include fixed, mobile, and portable devices including cellular telephones, personal digital assistants, tablet personal computers (tablet PCs), and devices that are built into automobiles, televisions, computers, and the like. The mobile device 210 has an application 211 that enables the mobile device 210 to access a number of different client domain sites using the application 211. The application 211 may be acquired through normal distribution channels such as, for example, the Apple App Store® or the Android Market™.

The third-party directory service 212 is associated with a third-party organization that provides a variety of service solutions, mobile and otherwise, to any number of different clients. The service solutions may, in one aspect, involve sensitive information such as, for example, financial information, educational information, third-party information, legal information, healthcare information, and the like. The transmission and handling of this information may be governed by state and federal laws such as, for example, the Health Insurance Portability and Accountability Act (HIPAA) with respect to healthcare information, and the Family Education Rights and Privacy Act (FERPA) with respect to educational information. In turn, the clients served by the third-party organization may include financial institutions, educational institutions, insurance companies, law firms, healthcare facilities, and the like. Because of the sensitive nature of the information, many of these clients operate on private networks that prohibit access to unauthorized parties. Further, for security, privacy, and compliance reasons, the client are interested in maintaining the privacy of any URLs that can potentially lead to access to the sensitive information. Thus, in one aspect, the third-party directory service 212 comprises any number of private client domain URLs of clients who utilize the service solutions offered by the third-party organization. The third-party organization may add or delete clients to the third-party directory service 212 without requiring the user to download a new application to the mobile device 210.

The client gateway service 214 is accessible via a client domain URL such as, for example, a client domain URL associated with the third-party directory service 212. The client gateway service 214 is associated with a client such as, for example, any of the clients outlined above. In one aspect, the client is a healthcare facility. The client gateway service 214 controls all user traffic to service solutions provided by the third-party organization and hosted by the client. Again, because of the sensitive nature of the information involved, the service solutions may be within the client's private network, and the client gateway service 214 limits access to authenticated users.

Continuing on with respect to FIG. 2, at step 216 a set of authorization credentials 218 is received by the mobile device 210. In one aspect, the set of authorization credentials 218 is received subsequent to a user of the mobile device 210 inputting the set of authorization credentials after accessing the application 211 on the mobile device 210. For example, the user may be interested in accessing service solutions hosted by a client to whom the user is affiliated. Upon accessing the application 211, the user is presented with a login screen that enables the user to enter, for example, an organization name and an authorization token (i.e., the set of authorization credentials 218). The organization name and authorization token, in turn, may have been assigned to the user by the client to whom the user is affiliated. Thus, only authorized users are able to access the third-party directory service 212.

Figure 7:
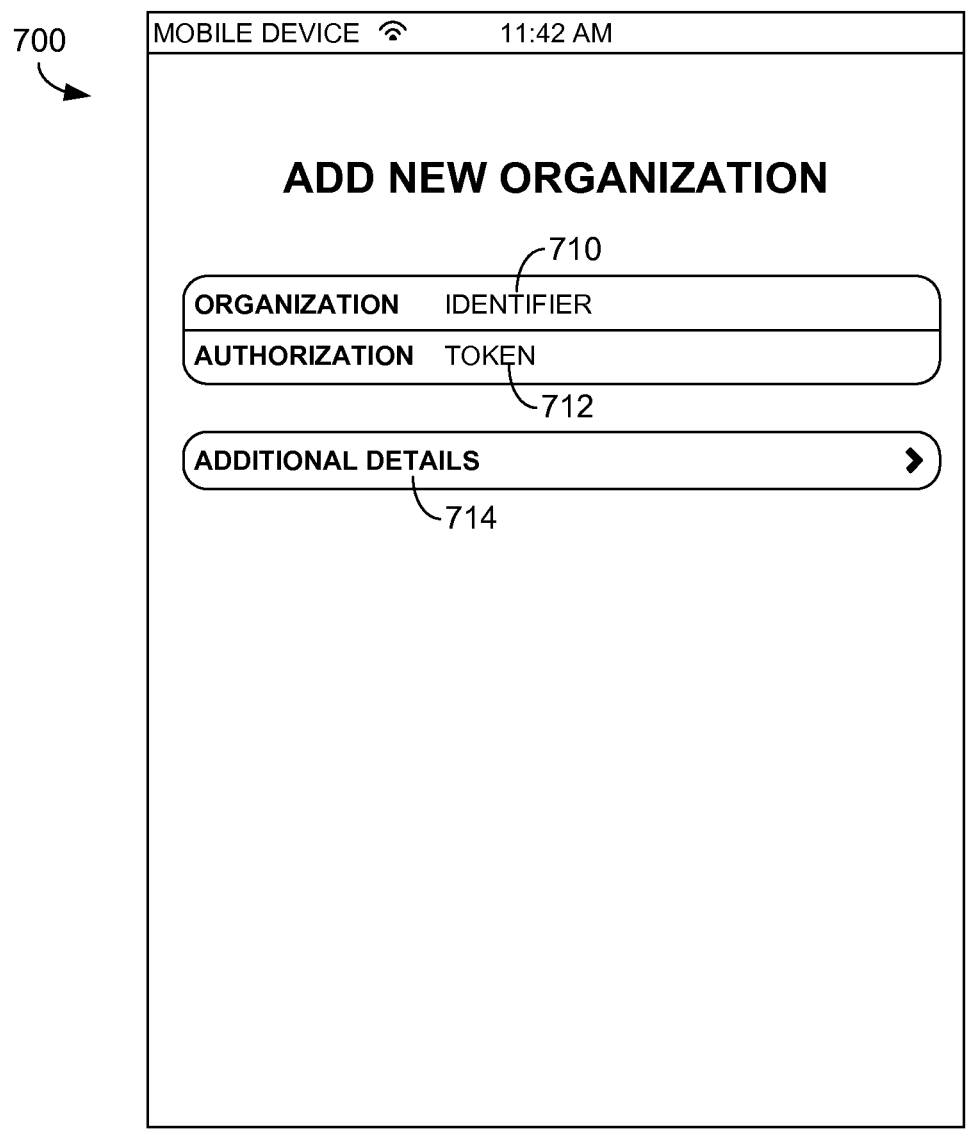
FIG. 7 depicts an exemplary user interface illustrating an initial login screen used to access a third-party directory service according to an embodiment of the present invention.

FIG. 7 depicts an exemplary user interface (UI), referenced generally by the numeral 700, illustrating a login screen that enables a user to enter an organization name and an authorization token. The UI 700 includes a first input area 710 for inputting an organization name, a second input area 712 for inputting an authorization token, and a third area 714 that enables the user to access additional information regarding, for example, the login procedure. The UI 700 is generated by an application such as the application 211 of FIG. 2. The appearance of the UI 700 is uniform across all clients in, for example, the third-party directory service 212.

At step 220, the mobile device 210 communicates a set of authorization credentials 222 to the third-party directory service 212. The set of authorization credentials 222 may be the same as the set of authorization credentials 218. Upon receipt of the set of authorization credentials 222, the third-party directory service 212 registers the mobile device 210. Registration of the mobile device 210 may also include an exchange of information including the type of mobile device 210, features of the mobile device 210, firmware associated with the mobile device 210, version of the firmware associated with the mobile device 210, and the like.

In one aspect of the invention, the third-party directory service 212 has a list of banned devices provided by, for example, the third-party organization or the clients. These devices may be banned for security reasons (for example, a user has reported that the user's device has been lost or stolen and may be in the hands of an unauthorized user). If a banned device attempts to register with the third-party directory service 212, the third-party directory service 212 may deny access to the banned device.

Continuing on with respect to FIG. 2, at step 224, the third-party directory service 212 determines client information associated with the set of authorization credentials 222. The third-party directory service 212 may access a third-party directory data store (not shown) in order to retrieve the client information. The third-party directory data store stores, among other things, a plurality of client domain URLs. In one aspect, the client domain URLs correspond to multiple, different clients that utilize service solutions offered by the third-party organization. In another aspect, the client domain URLs correspond to multiple domains associated with a single client; the multiple domains correspond to specific service solutions hosted by that client. Further, in one aspect, the client domain URLs comprise private internet protocol (IP) addresses or domain name system (DNS) entries.

The third-party directory data store may also store rendering information in association with the client domain URLs; the rendering information may include images, logos, and/or styling elements that are unique to each client. The rendering information is used by the mobile device 210 to render for display a user interface incorporating the images, logos, and/or styling elements. This aspect will be discussed in greater depth below.

At step 226, the third-party directory service 212 communicates client information 228 to the mobile device 210. As mentioned above, the client information 228 may include, among other things, a client domain URL and rendering information. At step 230, the client information 228 is stored on the mobile device 210. For example, the client information 228 may be stored as a bookmark on the mobile device 210.

At step 232, an indication 234 is received by the mobile device 210. The indication 234 specifies that the user desires access to the client information 228. At a high level, the user is indicating that he or she wishes to access one or more of the service solutions hosted by the client. The indication 234 may comprise the user selecting the bookmark associated with the client information 228.

Figure 8:
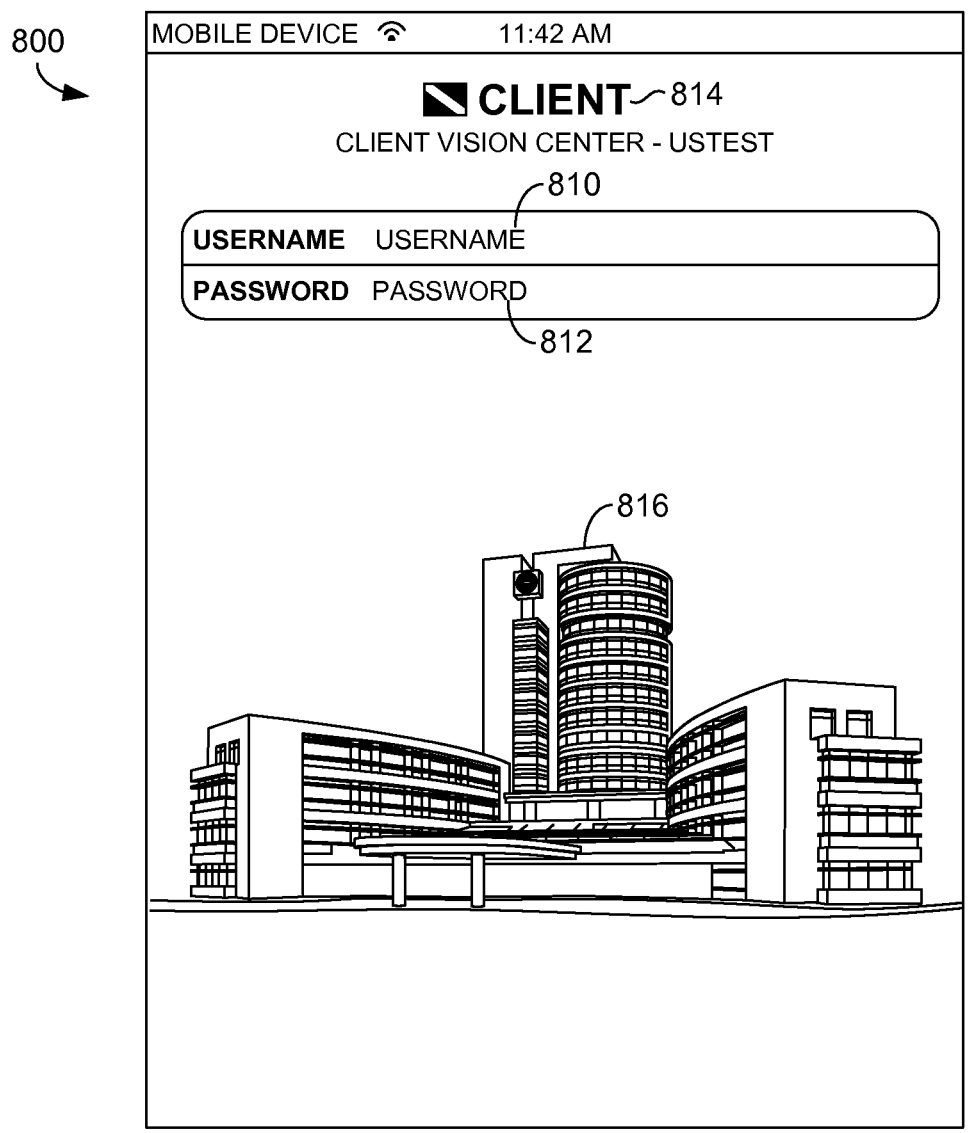
FIG. 8 depicts an exemplary user interface illustrating a login screen used to access a client gateway service according to an embodiment of the present invention.

At step 236, the mobile device 210 uses the rendering information that is part of the client information 228 to render for display a user interface. The user interface is customized to the particular client and/or to a particular domain associated with the client. The rendering information may include styling elements, logos, and one or more images. FIG. 8 depicts an exemplary user interface (UI), referenced generally by the numeral 800, illustrating a login screen that enables a user to input a username and password. The UI 800 comprises a first input area 810 for inputting a username, a second input area 812 for inputting a password, a title 814 with styling elements, and an image 816. As mentioned, the layout of the UI 800, including the title 814 with styling elements and the image 816, is determined by rendering information that is part of, for example, the client information 228.

At step 238, a set of authentication credentials 240 is received by the mobile device 210. In one aspect, the user of the mobile device 210 utilizes the user interface that was rendered at step 236 to input the set of authentication credentials 240. In one aspect, the set of authentication credentials 240 includes a username and password that identifies the user or a user role to the client. For example, the user may be identified as John Smith, or the user may be identified by the user's role such as, for example, nurse shift manager.

At step 242, the mobile device 210 communicates a set of authentication credentials 244 to the client gateway service 214. The set of authentication credentials 244 may be the same as the set of authentication credentials 240. The set of authentication credentials 224 may be communicated by the mobile device 210 to the client gateway service 214 using the client domain URL that is part of the client information 228. The set of authentication credentials 224 may be communicated via the Internet if the mobile device 210 is operating in a public network. Alternatively, the set of authentication credentials 224 may be communicated directly to the client gateway service 214 without exposing the client domain URL to the Internet if the mobile device 210 is operating within the client's private network.

At step 246, the client gateway service 214 determines whether to allow the mobile device 210 access to the client gateway service 214. In one aspect of the invention, the client gateway service 214 may deny access because the username and/or password are incorrect. In another aspect, the client gateway service 214 may deny access because the mobile device 210 has not been pre-registered with the client gateway service 214 (for example, by registering a serial number associated with the mobile device 210). In yet another aspect of the invention, the client gateway service 214 may grant access based on the username and password without requiring that the mobile device 210 be pre-registered with the client gateway service 214. In still yet another aspect, when a user has multiple devices, the client gateway service 214 is able to control which devices have access to the client gateway service 214 even though the same username and password are utilized on each device.

Continuing, the client gateway service 214 may additionally control access based on the type of the mobile device 210, what type of firmware is present on the mobile device 210, the firmware version on the mobile device 210, the type of application 211 used to access the client gateway service 214, and/or the version of the application 211. By restricting access based on any of the above factors, the client gateway service 214 provides a secure entry point to the sensitive information associated with the service solutions. Additionally, by controlling such factors as type or version of firmware, and type or version of application, the client gateway service 214 ensures that the access process runs smoothly by avoiding incompatibility issues.

At step 248, the client gateway service 214 determines service solutions that are available to the user. Depending on the identity of the user and/or user role as determined by the set of authentication credentials 244, the client gateway service 214 may determine that the user has access to one or more service solutions. Continuing, at step 250, the client gateway service 214 communicates with the one or or more service solutions to retrieve needed information.

By way of an illustrative example, the user may be a clinician wishing to view a patient list. Based on the set of authentication credentials 244, the client gateway service 214 accesses, for example, an electronic medical record associated with a healthcare facility and retrieves the patient list. The patient list is subsequently displayed to the clinician on a user interface on the mobile device 210. The user interface is generated by the application 211 and is uniform across all clients. For instance, a patient list is displayed on the same UI regardless of the identity of the client.

Continuing on with FIG. 2, at step 252, information 254 is exchanged between the mobile device 210 and the client gateway service 214. The information 254 comprises information from one or more service solutions. In one aspect, the exchange of information may be bi-directional. For example, the user may input requested information which is communicated to the service solutions via the client gateway service 214. At step 256, the information 254 is presented to the user. As mentioned above, the information 254 may be presented on a user interface suitable to present that type of information. The user interface for that type of information may be uniform across all clients.

In one aspect of the invention, the application 211 can be accessed to enable a user a preview of the various functionalities associated with the application 211; this is known as demo mode. For example, a user can download the application 211 to the user's mobile device 210. The user selects demo mode and the demo request is sent to the third-party directory service 212. The third-party directory service 212 routes the application 211 to a false data source, and the user can then preview the various functionalities of the application 211 using the false data source. The application 211 does not require custom coding to enable this aspect of the invention.

Figure 3:
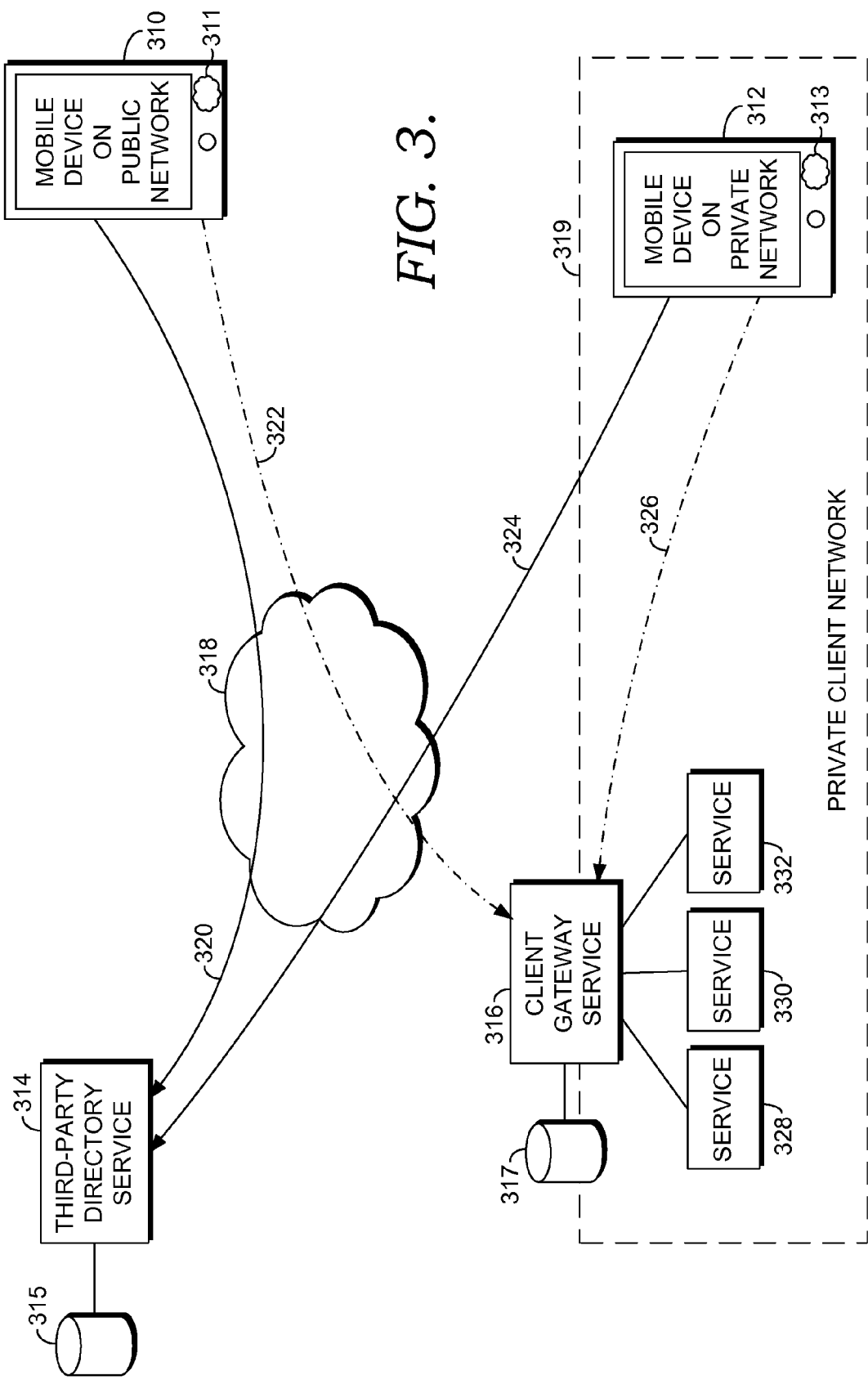
FIG. 3 is a block diagram of an exemplary system for providing secure access to a plurality of private client domain sites suitable for use in implementing embodiments of the present invention.

Turning now to FIG. 3, a block diagram of an exemplary system for providing secure access to a plurality of private client domain sites is illustrated and is referenced generally by the numeral 300. The exemplary system 300 includes a mobile device 310 on a public network with an application 311, and a mobile device 312 on a private network with an application 313. The mobile device 310, the mobile device 312, and the applications 311 and 313 may be the same as the mobile device 210 and the application 211 of FIG. 2 and, as such, will not be discussed in detail herein. The exemplary system 300 also includes a third-party directory service 314 with a corresponding third-party directory data store 315, a client gateway service 316 with a corresponding client gateway data store 317, and services 328, 330, and 332. The third-party directory service 314 may be the same as the third-party directory service 212 of FIG. 2. As well, the client gateway service 316 may be the same as the client gateway service 214 of FIG. 2. The exemplary system 300 also includes an Internet 318, a private client network 319, and communication paths 320, 322, 324, and 326.

The first time a user of the mobile device 310 on the public network desires to access a service solution offered by a client to whom the user is affiliated, the user accesses the application 311. Upon accessing the application 311, the user is presented with a UI (for example, the UI 700 of FIG. 7) that enables the user to access the third-party directory service 314. This is accomplished by the user inputting a set of authorization credentials which is communicated to the third-party directory service 314 via the communication path 320. As shown in FIG. 3, this communication occurs via the public Internet 318.

Using the set of authorization credentials, the third-party directory service 314 provides the user with a client domain URL which may be stored as a bookmark on the mobile device 310. Thereafter, when the user wishes to access the client gateway service 316 to take advantage of a service solution, the user selects the bookmark, and the client domain URL directs the user to the client gateway service 316 via the communication path 322. As shown in FIG. 3, this communication also occurs via the public Internet 318.

The process is similar with respect to the mobile device 312 on the private client network 319. By way of illustrative example, the mobile device 312 may be physically located within the four walls of a healthcare facility which has its own secure Intranet or WiFi®. The mobile device 312, through the application 313, initially utilizes the communication path 324, via the Internet 318, to access the third-party directory service 314. However, subsequent access to the client gateway service 316 occurs within the private client network 319 via the communication path 326.

Continuing on with FIG. 3, the third-party directory service 314 includes the third-party directory data store 315. The third-party directory data store 315 stores information associated with any number of clients. The information may include client domain URLs as well as rendering information. In one aspect, the client domain URLs may comprise private IP addresses or DNS entries. Additionally, the third-party directory data store 315 may also store relationships between client domain URLs and authorization credentials. These relationships may be utilized by the third-party directory service 314 to determine a client domain URL associated with a set of authorization credentials. As well, the third-party directory data store 315 may store relationships between a client and client domain URLs associated with that client. For example, a single client may host a number of different service solutions each of which is accessible by a different client domain URL.

The client gateway service 316 is a secure access point to a number of different service solutions such as the services 328, 330, and 332. The client gateway service 316 controls access to the services 328, 330, and 332 in a number of different ways. Some examples include restricting access based on the type of mobile device 310 or 312, restricting access based on the application 311 or 313, restricting access based on an inputted set of authentication credentials which may include a username and password, and restricting access based on a relationship between the user and the mobile device 310 or 312.

The user of the mobile device 310 or 312 logs in every time the user accesses the client gateway service 316. For instance, upon accessing the application 311 or the application 313, the user is presented with a UI such as, for example, the UI 800 of FIG. 8. The user inputs a set of authentication credentials that identifies the user and/or user role. The application 311 or 313 may then generate another UI that enables the user to input information concerning which of the services 328, 330, and/or 332 the user would like to access. The application 311 or 313 may further specify which version of the services 328, 330, and/or 332 should be accessed, or which feature(s) of the services 328, 330, and/or 332 should be accessed. Based on this information, the client gateway service 316 determines the appropriate service 328, 330, and/or 332 to access in order to retrieve the needed information. The services 328, 330, and/or 332 may be modified without requiring that a new application be downloaded to the mobile device 310 or 312. Further, one or more additional services may be added, or an existing service may be deleted without requiring that a new application be downloaded.

In one aspect of the invention, the first time the user accesses one of the services such as, for example, the service 328, the user logs in with a unique identifier. The unique identifier may be stored on a security server (not shown) that is associated with the client gateway service 316. Subsequently, when the user logs in to the client gateway service 316 and requests access to the service 328, the client gateway service 316 retrieves the unique identifier from the security service and uses the unique identifier to access the service 328. This prevents the user from having to log in to the service 328 each time access is desired.

Further, the client gateway service 316 is configured to store preferences set by the user. For example, the application 311 or 313 enables the user to set preferences when using a particular service (i.e., services 328, 330, and/or 332). Preferences may include, for example, defaulting to a specified tab, defaulting to a specified patient list, sorting the information in a certain way, and the like. These preferences are unique to the client and the service. When the user logs in to the client gateway service 316 using the mobile device 310 or 312, or when using another device such as a tablet PC, the client gateway service 316 communicates the preferences to the device. Thus, the user is not required to set preferences on each device when using a particular service.

Additionally, the client gateway service 316 is configured to allow testing of the services 328, 330, and/or 332. The testing may occur independent of the application 311 or 313. For instance, technical support can access the client gateway service 316 to perform testing without having to access the client gateway service 316 through the application 311 or 313.

Figure 4:
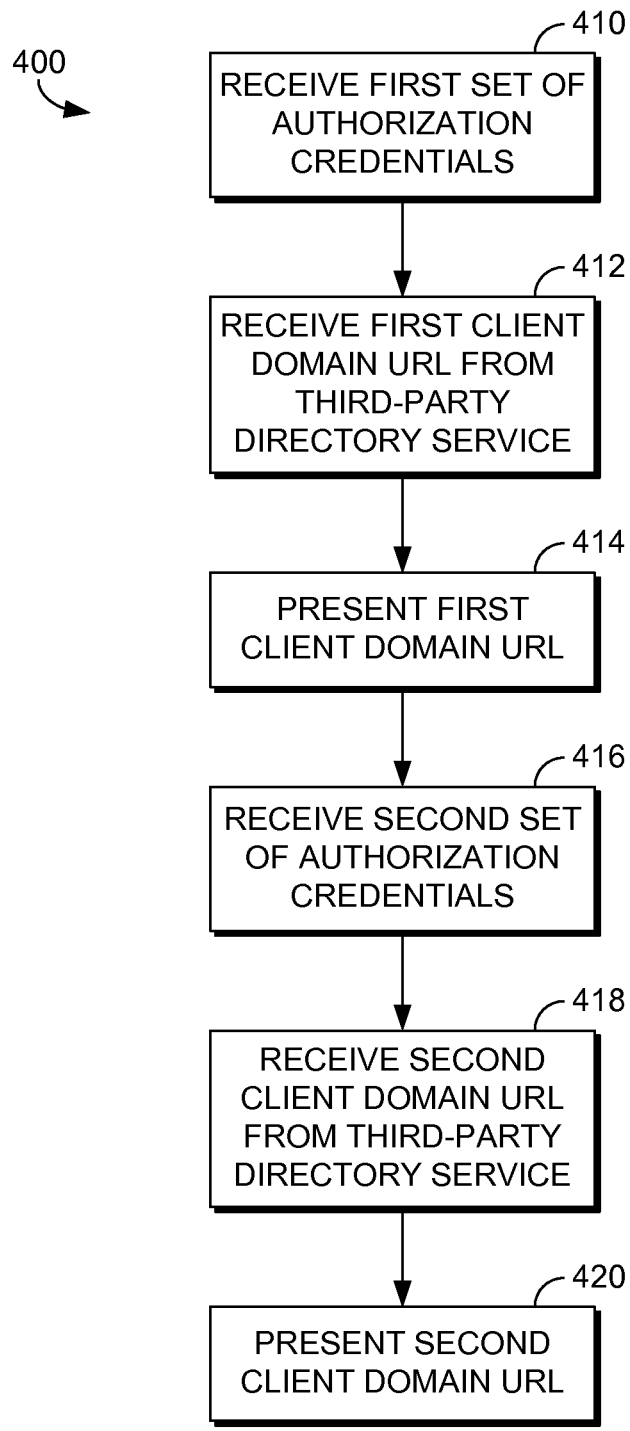
FIG. 4 depicts a flow diagram that illustrates a method of utilizing a single application on a mobile device to access multiple client domain sites according to an embodiment of the present invention.

Turning now to FIG. 4, a flow diagram is depicted illustrating a method 400 of using a single application on a mobile device to provide secure access to a plurality of client domain sites. At step 410, a first set of authorization credentials is received from a user of the mobile device. The mobile device may be, for example, the mobile device 210 of FIG. 2. The first set of authorization credentials may include an organization name and an authorization token. The first set of authorization credentials enables authorized users to access the third-party directory service.

At step 412, a first client domain URL is received from a third-party directory service such as the third-party directory service 212 of FIG. 2. The first client domain URL may comprise a private IP address and/or DNS entry. At step 414, the first client domain URL is presented to the user of the mobile device. The user may subsequently use the first client domain URL to access a number of different service solutions hosted by a client. In one aspect, the service solutions exist within the client's private network.

At step 416, the mobile device receives a second set of authorization credentials from the user. The second set of authorization credentials is received using the same application that received the first set of authorization credentials, for example, the application 211 of FIG. 2. At step 418, the mobile device receives a second client domain URL from the third-party directory service. The second client domain URL may be associated with an entirely different client than the first client domain URL, or the second client domain URL may be associated with the same client as the first client domain URL but directed toward different service solutions hosted by that client. At step 410, the second client domain URL is presented to the user. Like above, the user is able to use the second client domain URL to access one or more service solutions hosted by a client.

Figure 5:
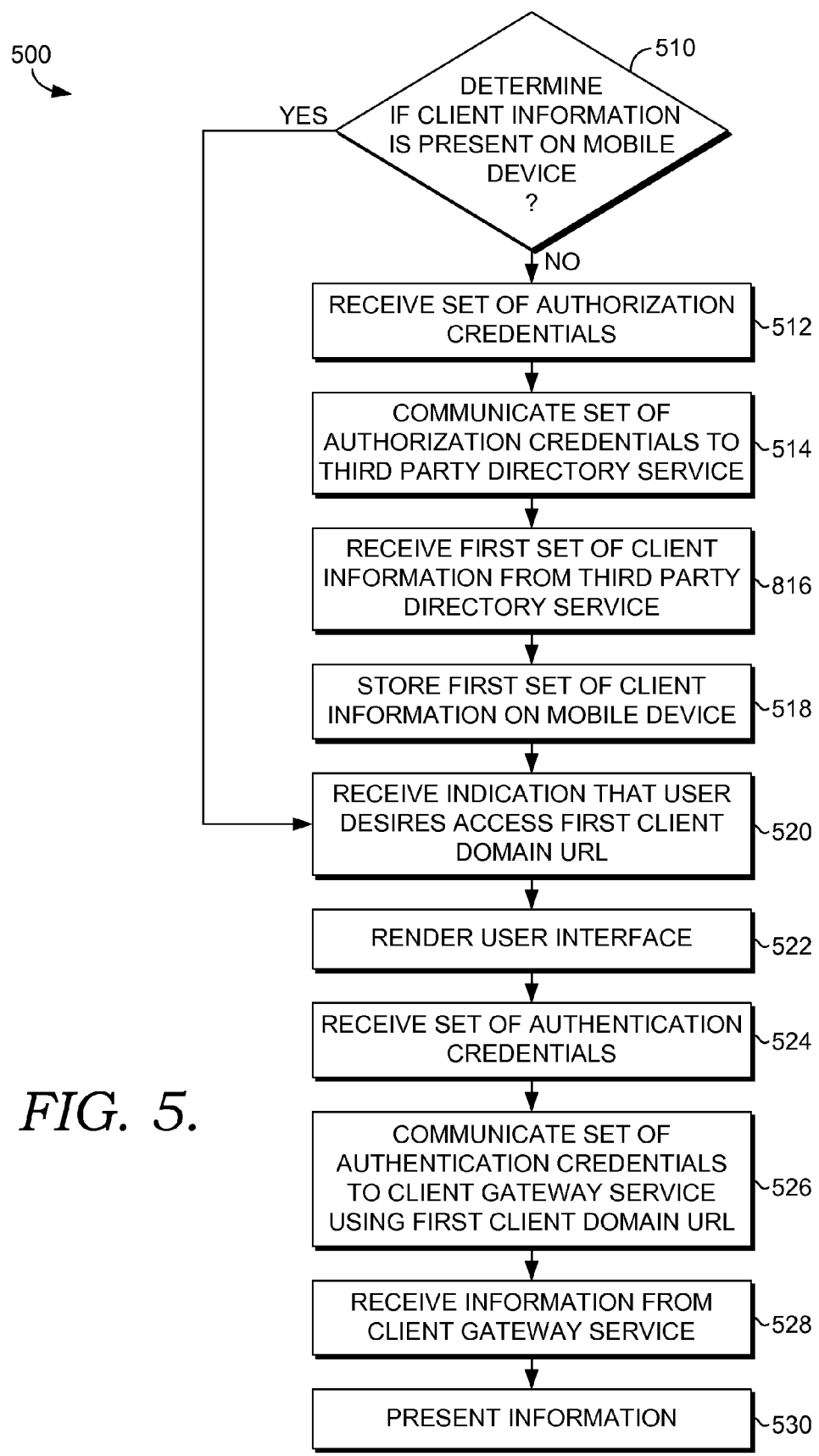
FIG. 5 depicts a flow diagram that illustrates a method of utilizing a single application on a mobile device to enable a user to securely access a plurality of different client domain sites according to an embodiment of the present invention.

Turning now to FIG. 5, a flow diagram is depicted illustrating a method 500 of using a single application on a mobile device to provide secure access to a plurality of private client domain sites. At step 510, a determination is made as to whether a first set of private client information is stored in association with the mobile device. The first set of private client information includes a first private client domain URL in association with rendering information. In turn, the rendering information includes, among other things, styling elements and/or one or more images or logos. The mobile device may have a bookmark that references the first set of private client information. If it is determined at step 510 that the first set of private client information is not stored in association with the mobile device, then, at step 512, a set of authorization credentials is received from a user of the mobile device. The set of authorization credentials may be received via the user inputting an organization name and an authorization token on a UI generated by the application.

At step 514, the set of authorization credentials is communicated to a third-party directory service. The third-party directory service is associated with a third-party organization that provides service solutions to any number of clients. In one aspect of the invention, the service solutions include healthcare-related solutions, and the clients include healthcare facilities. The third-party directory service includes a third-party directory data store that stores, among other things, relationships between sets of private client information and sets of authorization credentials.

At step 516, the first set of private client information is received from the third-party directory service. The first set of private client information is associated with the set of authorization credentials received at step 512. At step 518, the first set of private client information is stored in association with the mobile device. For example, the first set of private client information may be stored as a bookmark on the mobile device.

The method 500 continues at step 520 where an indication is received that the user desires access to the first private client domain URL. Alternatively, if a determination is made at step 510 that the first set of private client information is present on the mobile device, then the method resumes at step 520. The indication may comprise the user of the mobile device selecting the bookmark that references the first set of private client information. The user may desire access to the first private client domain URL when wanting information from service solutions hosted by the client. At step 522, the application uses the rendering information that is part of the first set of private client information to render a UI. The UI is rendered with the styling elements, images, and logos specified by the rendering information. The UI is unique for each client, and even for each service solution offered by a single client. The UI enables the user to input a set of authentication credentials.

Continuing, at step 524, the set of authentication credentials is received by the mobile device. The set of authentication credentials includes a username and password that act to identify the user and/or a user role to a client gateway service. At step 526, the set of authentication credentials is communicated to the client gateway service using the first private client domain URL. In one aspect of the invention, the mobile device must be pre-registered with the client gateway service in order for the client gateway service to receive the set of authentication credentials.

At step 528, information is received from the client gateway service. As mentioned above, the information may comprise healthcare-related information protected by various state and federal laws. At step 530, the information is presented to the user on a UI that is generated by the application on the mobile device; the UI may be generic across all clients (i.e., the UI may not include styling elements, images, and/or logos that are unique to any particular client).

The method 500 may also be utilized when the user wishes to access a service solution associated with a different client or an additional service solution hosted by the same client. In this situation, the user inputs a new set of authorization credentials to access the third-party directory service, and a new set of authentication credentials to access the client gateway service.

Figure 6:
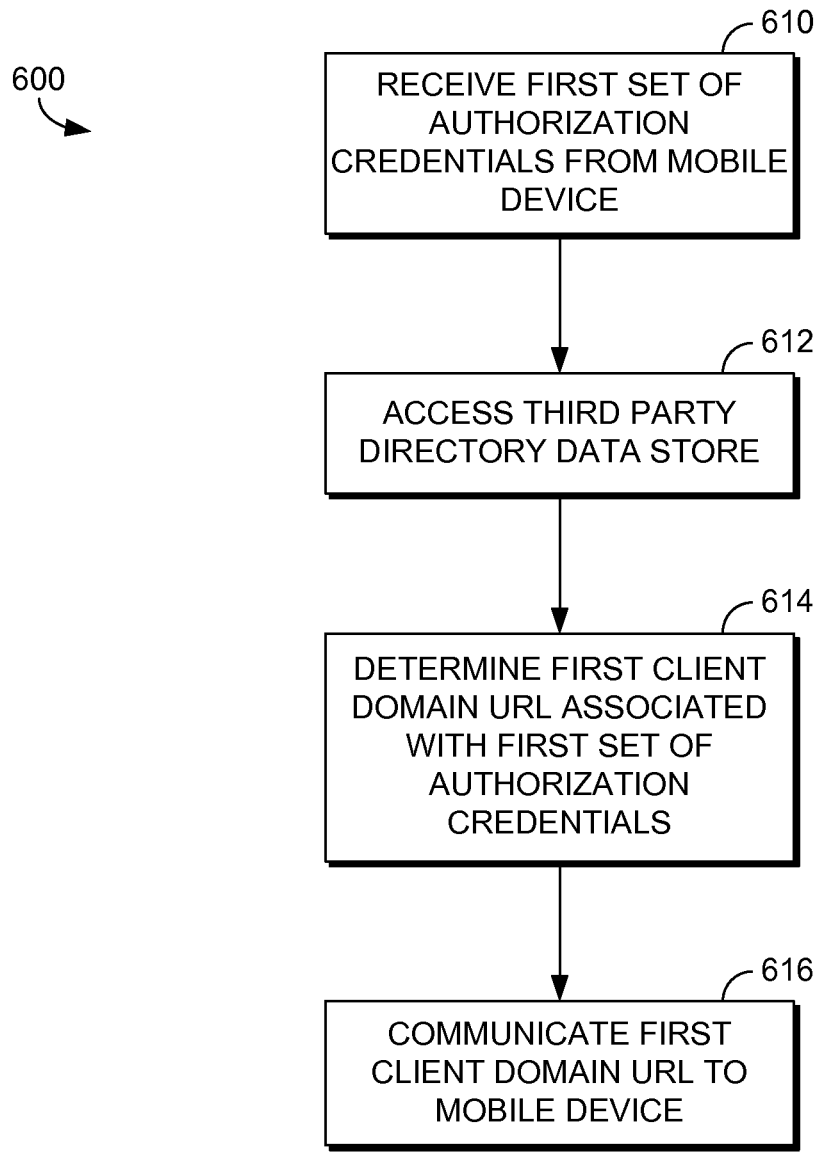
FIG. 6 depicts a flow diagram that illustrates a method of using a third-party directory service to provide secure access to a plurality of different client domain sites according to an embodiment of the present invention.

Turning now to FIG. 6, a flow diagram is depicted illustrating a method 600 of using a third-party directory service to provide secure access to any number of client domain sites. At step 610, the third-party directory service receives a first set of authorization credentials from a single application on a mobile device. The first set of authorization credentials enables access to the third-party directory service. At step 612, the third-party directory service accesses a third-party directory data store. The third-party directory data store comprises a plurality of private client domain URLs. In one aspect, the private client domain URLs are stored in association with sets of authorization credentials.

At step 614, using the third-party directory data store, a first private client domain URL that is associated with the first set of authorization credentials is determined, and, at step 616, the first private client domain URL is communicated to the mobile device. The method 600 may be used to communicate any number of private client domain URLs to the mobile device. However, only those private client domain URLs corresponding to authorization credentials are communicated. Thus, the user is restricted from viewing any client information except client information for which the user has authorization to view.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. One or more non-transitory computer-readable storage media having computer-executable instructions embodied thereon that, when executed by a computing device, facilitate a method of using a single application on a mobile device to provide secure access to a plurality of private client domains, the method comprising:

the single application on the mobile device:
  (A) determining whether a first private client domain uniform resource locator (URL) is stored in association with the mobile device, the first private client domain URL associated with a first client;
  (B) if the first private client domain URL is not stored in association with the mobile device, then:
    a) receiving a first set of authorization credentials from a first user of the mobile device, the first set of authorization credentials identifying the first user and the first set of authorization credentials useable for accessing a third-party directory service;
    b) communicating the first set of authorization credentials to the third-party directory service, wherein the third-party directory service comprises a data store storing a plurality of mappings, each mapping of the plurality of mappings comprising a set of authorization credentials identifying a particular user mapped to one or more private client domain URLs associated with a particular client to whom the particular user is affiliated with, and wherein the third-party directory service uses the first set of authorization credentials to determine the first private client domain uniform resource locator (URL) mapped to the first set of authorization credentials, the first private client domain URL associated with a first client to whom the first user is affiliated with;
    c) receiving from the third-party directory service only the first private client domain URL;
    d) storing the first private client domain URL in association with the mobile device;
  (C) if the first private client domain URL is stored in association with the mobile device, then:
    a) receiving an indication that the first user desires to access the first private client domain URL;
    b) using rendering information associated with the first private client domain URL, rendering for display a user interface, the user interface useable for receiving a set of authentication credentials from the first user, the set of authentication credentials useable for accessing a client gateway service;
    c) receiving the set of authentication credentials from the first user;
    d) using the first private client domain URL, communicating the set of authentication credentials to the client gateway service;
    e) receiving information from the client gateway service; and
    f) presenting the information to the first user of the mobile device.

2. The media of claim 1, wherein the rendering information comprises at least styling elements and one or more images.

3. The media of claim 1, wherein the third-party directory service is associated with a third-party organization that provides service solutions to a plurality of clients.

4. The media of claim 3, wherein the service solutions comprise healthcare-related service solutions, and wherein the plurality of clients comprise healthcare facilities.

5. The media of claim 1, wherein the first private client domain URL is stored as a bookmark on the mobile device.

6. The media of claim 1, wherein the set of authentication credentials comprise a username and a password that identify the first user to the client gateway service.

7. The media of claim 1, wherein the mobile device is registered with the client gateway service.

8. The media of claim 1, wherein the client gateway service is associated with the first client, and wherein the client gateway service controls user access to one or more service solutions hosted by the first client, the one or more service solutions comprising healthcare-related service solutions.

9. The media of claim 8, wherein the client gateway service controls user access to the one or more healthcare-related service solutions hosted by the first client based on at least one of the following alone or in combination:
  (A) the set of authentication credentials,
  (B) an identity of the mobile device,
  (C) an identity of firmware present on the mobile device,
  (D) an identity of a firmware version present on the mobile device,
  (E) a relationship between the first user and the mobile device,
  (F) an identity of the single application, or
  (G) an identity of a version of the single application.

10. The media of claim 8, wherein the one or more service solutions exist within a private client network.

11. The media of claim 10, wherein the first private client domain URL is used when the first user and the mobile device are physically located within a facility of the client.

12. The media of claim 1, wherein the information received from the client gateway service comprises healthcare information governed by the Health Insurance Portability and Accountability Act (HIPAA).

13. The media of claim 1, further comprising:
  (A) determining whether a second private client domain URL is stored in association with the mobile device;
  (B) if the second private domain URL is not stored in association with the mobile device, then:
    a) receiving a second set of authorization credentials from the first user, the second set of authorization credentials identifying the first user, wherein the second set of authorization credentials is different from the first set of authorization credentials;
    b) communicating the second set of authorization credentials to the third-party directory service, wherein the third-party directory service accesses the data store to determine the second private client domain URL mapped to the second set of authorization credentials, the second private client domain URL associated with a second client to whom the first user is affiliated with;
    c) receiving from the third-party directory service only the second private client domain URL;
    d) storing the second private client domain URL in association with the mobile device;
  (C) if the second private client domain URL is stored in association with the mobile device, then:
    a) receiving an indication that the first user desires to access the second private client domain URL;
    b) using rendering information associated with the second private client domain URL, rendering for display a user interface, the user interface useable for receiving a second set of authentication credentials from the first user, the second set of authentication credentials useable for accessing the client gateway service;
    c) receiving the second set of authentication credentials from the first user;
    d) using the second private client domain URL, communicating the second set of authentication credentials to the client gateway service;
    e) receiving information from the client gateway service; and f) presenting the information to the first user of the mobilevice.

\* \* \* \* \*